April 8, 1952 H. D. KIRBY ET AL 2,592,158
PHOTOGRAPHIC FILM MAGAZINE
Filed Nov. 8, 1945 3 Sheets-Sheet 1
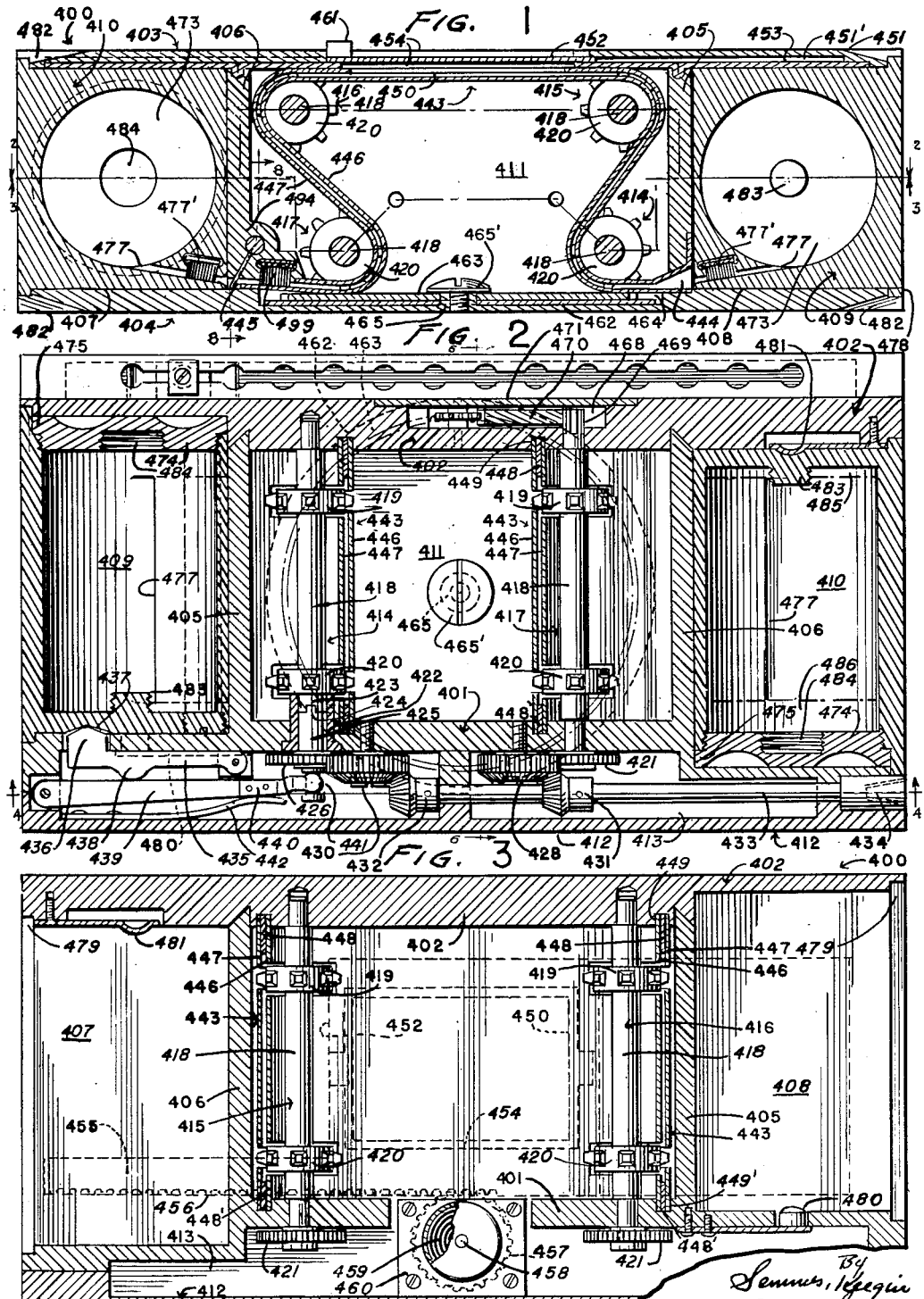
INVENTORS: HERBERT D. KIRBY & CHARLES F. KRAUSE
ATTORNEYS

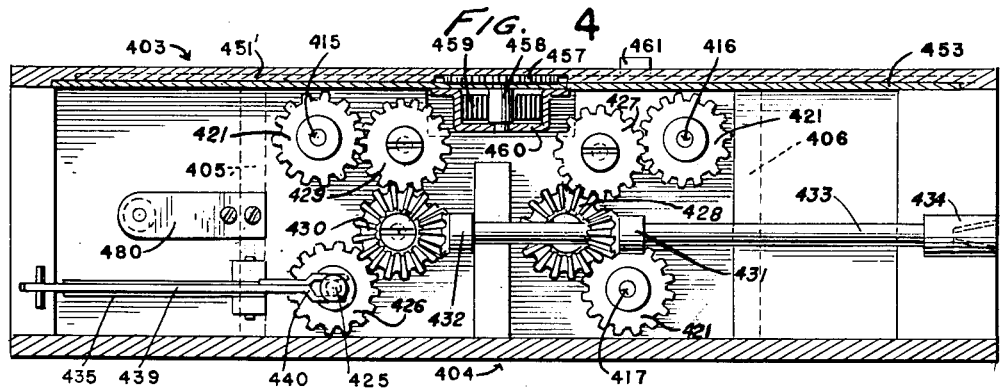
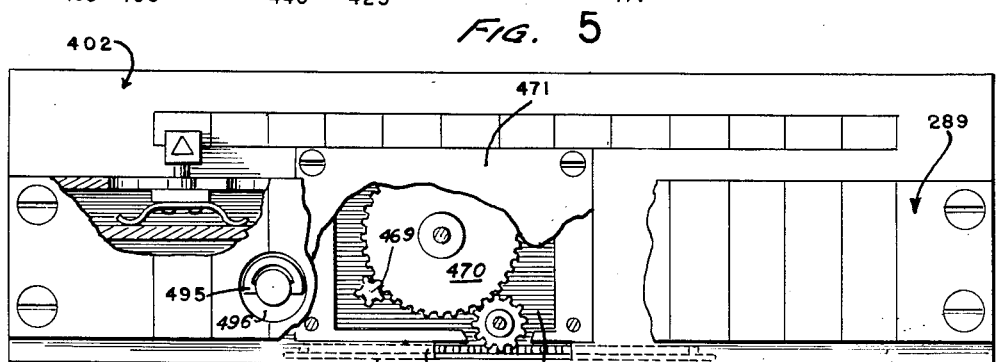
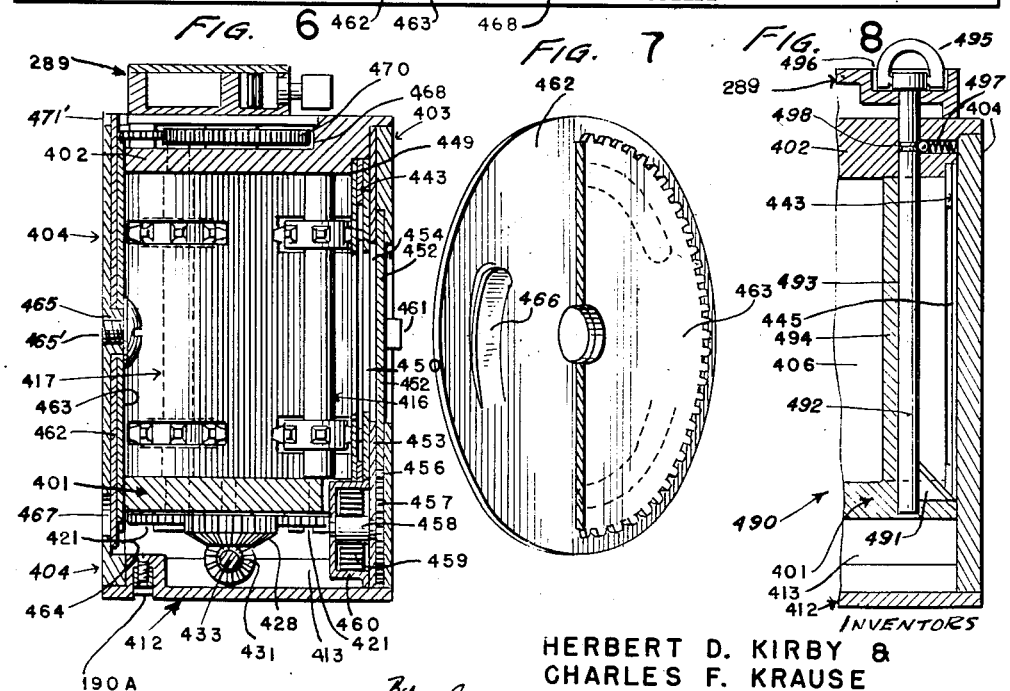
INVENTORS
HERBERT D. KIRBY &
CHARLES F. KRAUSE
ATTORNEYS

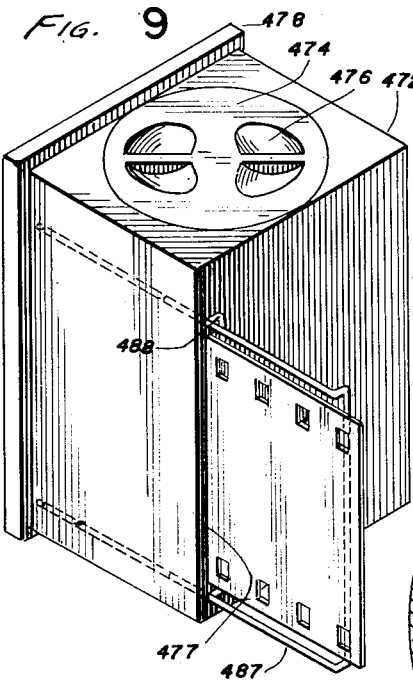
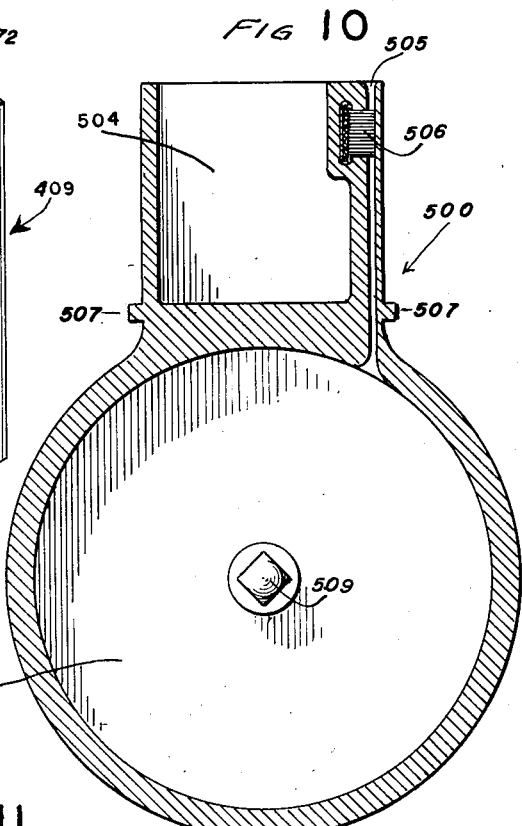
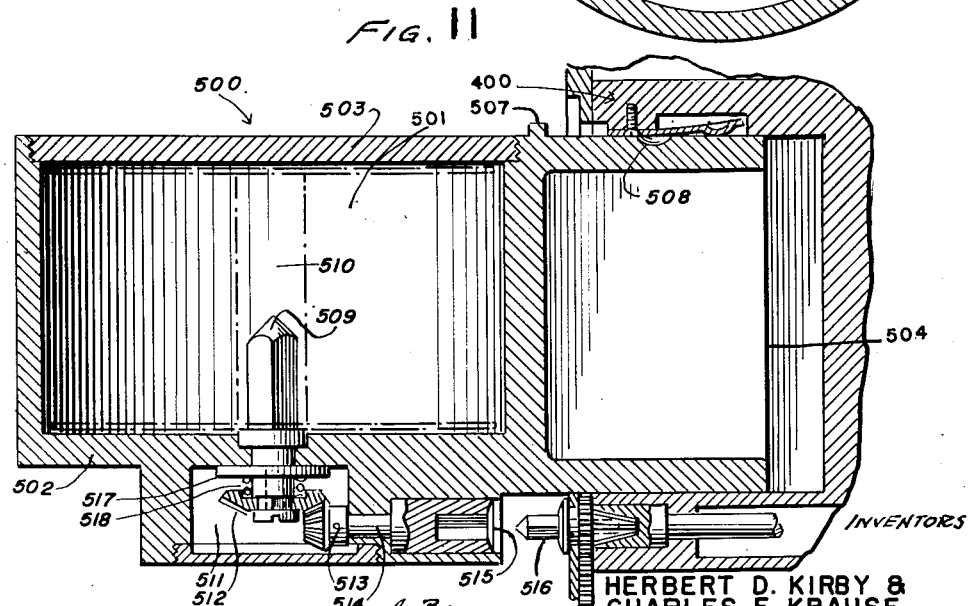

Patented Apr. 8, 1952

2,592,158

UNITED STATES PATENT OFFICE 2,592,158

PHOTOGRAPHIC FILM MAGAZINE

Herbert D. Kirby, Hayden Lake, Idaho, and Charles F. Krause, Bellevue, Wash.; said Krause assignor to said Kirby Application November 8, 1945, Serial No. 627,435

8 Claims. (Cl. 242—71)

The present invention relates to photographic cameras and more particularly to a film container or magazine comprising a light-tight unit provided with easily and quickly removable and interchangeable film cartridges which forms a component part of the camera, whereby exposures of the same or different scenes may be made in relatively rapid succession on the same or different type film.

The film container or magazine constituting this invention may be a permanent part of a camera construction or a detachable unit thereof. It is particularly adaptable to the type of camera disclosed in copending application Serial Number 625,144, filed October 29, 1945, now Patent No. 2,553,656, dated May 22, 1951, by Herbert D. Kirby, being interchangeable with the film magazine of this camera; this camera, however, forms no part of the present invention.

In using roll film particularly of the so-called miniature type which provides for eighteen, thirty-six or more exposures per roll, it is often desirable to process a portion of the roll prior to exposure of the entire roll. It is likewise often desirable to change the type of film being used in the camera, for example, change from black and white to color film, before the roll is completely exposed.

To accomplish the first result, roll film cameras have been heretofore provided with cut-off knives by means of which an exposed portion of the film may be cut off from the unexposed portion and removed from the camera. To accomplish the latter result various removable camera backs and magazines have been provided. In each case however, removal of a portion of the film has necessitated opening the camera box of magazine with consequent fogging of a substantial portion of the unexposed film. Moreover the use of several types of film interchangeable in a single camera has necessitated the use of a separate magazine or camera back for each type of film. These backs and magazines are relatively expensive and the cost to a professional photographer or serious amateur, in order to meet normal picture taking requirements, often represents an investment equal to the value of his camera.

It is therefore one of the principal objects of this invention to provide improved means for changing film of one type for another in a camera adapted for roll film.

Another object of the invention is to provide a light-tight unit for supporting film in picture taking position in a camera, the unit being adapted for the reception, from the outside thereof, of inexpensive, interchangeable light-tight cartridges which may be loaded with different types of film, the unit also incorporating mechanism for transporting the film from a loaded feeding cartridge to a receiving cartridge identical with the feeding cartridge.

Another object of the invention is to provide a unit of the above character in which the transport mechanism includes a series of sprockets, all normally driven from a common drive but including means responsive to the insertion of a loaded cartridge into the unit to first disengage and then reengage the first or input sprocket from the drive, whereby a short leader of film is engaged by the transport mechanism without manual threading of the film onto the sprockets.

A further object of the invention is to provide a unit of the above character incorporating externally insertable film cartridges and also incorporating a cut off mechanism adjacent the receiving cartridge for cutting the film strip and permitting removal of the receiving cartridge without exposing any of the unexposed film in the unit.

A still further object of the invention is to provide a unit of the above character and film containers or cartridges for use therewith, which is interchangeable with the cartridges above mentioned, and which are adapted to be loaded with and receive or take up relatively long strips of film commonly known as bulk film.

Another object of the invention is to provide cartridges of the above type with a normally nested support element which is extensible from the cartridge for supporting the short leader of film therefrom and assist in guiding the same into the unit.

Yet another object of the invention is to provide a unit of the above character with an exposure counting mechanism of novel design.

With these and other important objects and advantages in view, the invention consists in the parts and combinations hereinafter set forth and claimed, with the understanding that the several necessary elements comprising the invention may be varied by those skilled in the art without departing from the spirit of the invention or exceeding the scope of the appended claims.

In order to make the invention more clearly understood, reference is made to the accompanying drawings which illustrate preferred means for carrying the invention into practical effect.

In the drawings:

Figure 1 is a sectional view taken substantially along the horizontal median plane of a film magazine constructed in accordance with this invention.

Figure 2 is a vertical sectional view taken on the line 2—2 of Figure 1.

Figure 3 is a vertical sectional view taken on the line 3—3 of Figure 1.

Figure 4 is a horizontal sectional view taken on the line 4—4 of Figure 2.

Figure 5 is a top plan view partly broken away of the film magazine shown in Figure 2.

Figure 6 is a cross sectional view taken on the line 6—6 of Figure 2.

Figure 7 is a perspective view showing an exposure indicator disc and drive gear used in the film magazine.

Figure 8 is a sectional view taken on the line 8—8 of Figure 1 showing the film cut-off knife.

Figure 9 is a perspective view of one of the removable film cartridges used in the film magazine.

Figure 10 is a horizontal sectional view of a modified form of film cartridge used in the film magazine illustrated in Figure 1.

Figure 11 is a vertical sectional view of the cartridge shown in Figure 10 showing in section the associated parts of the magazine and camera.

Briefly the film supporting unit or magazine comprises a light tight casing, generally rectangular in shape and provided with an exposure opening normally closed by a sliding door. Film is transported by positively driven mechanism, self-contained within the unit, from a removable feed cartridge slidably inserted into one end of the casing, to a removable receiving cartridge slidably inserted in the opposite end. These cartridges are identical in design and interchangeable end for end in the magazine, and means are provided cooperating with the feed cartridge to permit "free wheeling" of at least a portion of the transport mechanism to facilitate threading a leader of the film thereonto without the necessity of opening the casing. Suitable exposure counting and film emulsion speed indicating means may be incorporated in the unit as well as cut off means for the film to permit removal of the receiving cartridge for processing exposed film prior to exposure of the complete load.

Referring now more particularly to the drawings the magazine comprises a casing 400 in which fit the film cartridges and which houses the necessary mechanism for operation of the magazine. The casing 400 comprises a bottom wall 401, top wall 402, front wall 403 and a rear wall 404. The bottom wall is formed with a pair of vertical partition walls 405 and 406, the upper ends of which join the top wall to form a light-tight fit therewith. These partitions divide the interior of the casing into a pair of pockets or receptacles 407 and 408 at opposite ends of the casing for the reception of film cartridges which are designated generally as 409 and 410, and a central chamber 411 through which film is transported from one cartridge to the other in making exposures. Secured to the underface of the bottom wall 401 is a cover member 412 which forms with the bottom wall, a chamber or gear casing 413 for housing the necessary gearing for transporting the film. When the above parts of the casing are assembled a light-tight interior is provided.

Mechanisms for transporting the film from one cartridge to the other comprise four film sprockets designated generally as 414, 415, 416 and 417. Each of these sprockets consists of a shaft 418 which carries an upper sprocket wheel 419 and a lower sprocket wheel 420 adapted to engage the upper and lower perforations of the film. The shafts 418 of the sprockets 415, 416 and 417 are journalled in the bottom and top walls 401 and 402, the lower ends of the shafts extending through the bottom wall into the gear chamber 413. The lower end of each of these shafts has attached thereto a gear 421. The lower end of the shaft of the sprocket 414 is journalled in a bushing 422 which extends through the bottom wall 401. The thus journalled end of this shaft is provided with a transverse slot 423 in which is adapted to fit a transverse spline 424 in the upper end of a short shaft 425 which is rotatably and slidably journalled in the bushing 422. The lower end of this shaft 425 extends into the gear housing 413 and carries a gear 426. As best seen in Figure 1, the sprockets 415 and 416 lie adjacent the inner surfaces of the partition walls 405 and 406 with their outer diameters substantially flush with the inner face of the front wall 403. The sprockets 414 and 417 lie adjacent the inner face of the rear wall 404 and are spaced somewhat inwardly from the sprockets 415 and 416.

The gears 421, carried by the sprockets 416 and 417, are operatively interconnected by a pair of idler gears 427 and 428 while the gear 421 carried by the sprocket 415 and the gear 426 are interconnected by a pair of idler gears 429 and 430. The gears 428 and 430 are combined spur and bevel gears, the bevel teeth of which mesh respectively with bevel pinions 431 and 432 carried on the inner end of a shaft 433 journalled in the gear case 413. The outer end of the shaft 433 carries a socket element 434 the outer face of which lies flush with the end face of the magazine. This socket element is adapted to cooperate with a manually operated key or suitable power operated mechanism, not shown, by means of which rotation may be imparted to the shaft 433.

In loading the film cartridge into the magazine it is desirable that the film encounter the least possible resistance in threading onto the first transport sprocket 414. To this end, the following mechanism is provided for disengaging the short shaft 425 from the shaft of the sprocket 414 and thereby disengage the sprocket 414 from the gear drive. As best seen in Figure 2, a lever 435 is pivoted at its inner end to the underface of the bottom wall 401. The free end of this lever has a right angle projection 436 which extends through an aperture, provided therefor in the bottom wall 401, and slightly into the cartridge receptacle 408. This extension has an angular or cam face which engages the lower face of the cartridge upon insertion thereof into the receptacle to depress the lever, and when the cartridge is fully inserted the cam face of the extension fits within a depression 437 provided therefor in the lower face of the cartridge to permit the lever to return to its normal position. Intermediate its length, the lever 435 is provided with a fulcrum 438 which engages a second lever 439 suitably pivoted at one of its ends in the gear housing. The free end of this lever 439 is provided with a bifurcated yoke 440 which rides in a peripheral groove 441 provided in an axial extension of the shaft 425. A leaf spring 442 secured to the cover plate 412 normally urges the lever 439 upwardly and as a consequence normally urges the shaft 425 upwardly into its splined engagement with the shaft of the sprocket 414.

To assist in guiding the film in its transport from one magazine to the other a film track designated generally as 443 is provided which extends from an opening 444 in the wall 405 to an opening 445 in the wall 406. As best seen in Figure 1, this film track extends from the wall 405 between the sprocket 414 and the rear wall 404, around the sprocket 414, thence around the sprocket 415, between it and the front wall 403, thence between the front wall 403 and the sprocket 416, around the sprocket 416, thence around the sprocket 417, between it and the rear wall 404 to the opening 445 in the partition wall 406.

Preferably this film track is made up of an inner wall 446 and an outer wall 447 parallel therewith and spaced therefrom by a top spacing strip 448 and a bottom spacing strip 448' which also serve as a guide for the upper and lower edge of the film being transported through the track. The film track is retained in position in the chamber 411 in grooves 449 and 449' formed respectively in the top wall 402 and the bottom wall 401. Between the sprockets 415 and 416 the outer wall 447 is cut away to provide an exposure aperture 450. Both the inner and outer walls of the film track are cut away adjacent the wheels of the film sprocket so that the sprocket teeth pass through the space between the walls and assure engagement of the sprockets with the film perforations during its transport.

The front wall 403 is preferably made up of two juxtaposed sections, a front panel 451, which is recessed in its rear face as indicated at 451' to accommodate a sliding door 452, and a rear cover plate 453. Both the front panel and cover plate are cut away coextensively with the exposure aperture 450 in the film track 443 to provide an exposure opening 454 in the front wall of the magazine. This opening is adapted to be closed, except when the magazine is inserted in the camera, by the door 452.

To automatically urge the door 452 to its closed position to cover the opening 454, the lower edge is provided with a longitudinal extension 455 the lower edge of which forms a continuation of the lower edge of the door and is provided with gear teeth 456. These teeth mesh with a gear 457 carried by one end of a short shaft 458, journalled in the cover plate 453, and to which is attached one end of a spiral spring 459 which is contained in and fastened to a spring case 460 secured to the cover plate 453.

The door 452 is provided, adjacent one end with a projecting lug 461 which is adapted to engage a suitable abutment in the magazine slide of the camera to open the door when the magazine is inserted into exposure position in the camera.

An exposure counter may be provided for the magazine and operated from the film transport mechanism. This counter consists of a circular disc 462 and a driving gear 463 in face to face abutting and concentric relation thereto. The disc and gear are mounted for rotation in a circular recess 464, in the back plate 404, on a stud 465 projecting from the rear face of the recess. The disc and gear are held together on the stud by a screw 465', and in frictional contact by means of a plurality of fingers 466 struck up from the disc as shown in Figure 7. The disc 462 has a circular series of numbers (not shown) on its outer face to designate the number of exposures which have been made. These designations may be viewed from the rear of the magazine through a small window 467, as shown in Figure 6.

To actuate the counter, the shaft of one of the transport sprockets, preferably the shaft of the sprocket 417, is extended through the top wall 402 of the magazine case into a recess 468 formed in the top wall, and has its upper end formed into a pinion 469. This pinion connects through an idler gear train 470 with the disc driving gear 463. The ratio between the pinion 469 and the gear 463 is selected to rotate the gear 463 and with it the disc 462 one increment, or the angle between the adjacent designating numerals thereon, for each frame of film transported past the exposure window of the magazine. For example, the size of the sprocket wheels 419 and 420 may be such that they are turned one revolution for each 35 mm. frame, while the disc 462 is laid out to indicate 36 exposures. In this case the gear ratio between the pinion 469 and the gear 463 will be 1 to 36. A cover plate 471 closes the recess 468 to enclose the gearing.

It will be noted from Figure 6 that the perimeter of the disc 462 lies substantially tangent with the upper surface of the top wall of the magazine. To provide means for manually resetting the exposure counter, the upper edge of the rear wall is notched as shown at 471' so that the disc may be exposed for manipulation by the operator, the frictional engagement between the disc 462 and gear 463 permitting relative rotary movement between those two members.

The film cartridges or film holders 409 and 410 are identical in construction and are interchangeable end for end in the magazine. As shown in Figures 1 and 2, 409 designates the loaded or feed cartridge adapted to contain unexposed film while 410 designates the receiving cartridge adapted to receive the transported film after exposure. It will be noted that the receiving cartridge is inverted with respect to the feeding cartridge, as inserted in the magazine, to align the film slots in the two cartridges with the ends of the film track 443.

These cartridges are preferably made of a molded plastic material and consist of a substantially rectangular body portion 472 which has a longitudinally extending cylindrical recess 473 therein. This recess is adapted to enclose the film, either in bulk form or contained in a conventional metal container or cartridge in which 18 or 36 frames of 35 mm. film is commonly sold. The recess 473 is adapted, in use, to be closed by a cover 474, preferably threaded into the open end of the recess and provided with an external flange 475 which forms a light-tight seal with the body 472. The outer face of the cover 474 may be suitably recessed such as shown in Figure 9 to provide finger engaging abutments 476 to facilitate insertion and removal of the cover.

Extending tangentially from the recess 473 through the body to adjacent one longitudinal edge thereof is a film slot 477 the outer extremity of which is preferably flared outwardly in a rounded curve. To prevent light leakage through this film slot a light trap is provided. This preferably consists of a metal backed strip of velvet or plush material 477' inserted in a groove provided therefor in one wall of the film slot 477 so that the pile of the material engages the opposite wall of the slot, or the emulsion face of the film in a loaded cartridge.

The cartridges, as stated, in use, are inserted into the end pockets or receptacles 407 and 408 of the magazine. To prevent light leakage into these pockets, the outer face of the cartridge is provided with an outwardly extending flange 478 which closely fits, when the cartridge is in place, against an internal shoulder 479 around the open end of the cartridge pocket. If desired, spring clips or detents such as shown at 480 and 481 may be provided in the pockets 407 and 408 to engage corresponding depressions in the cartridges to assist in holding the cartridges in their respective pockets against accidental displacement. Since the cartridges occupy relatively inverted positions in the magazine, preferably these clips are positioned respectively in the top and bottom of opposite cartridge pockets so that they will engage the bottom face of the cartridge. To facilitate removing the cartridges from the magazine the ends of the casing may be provided with finger notches such as shown at 482 so that the operator may more readily grasp the flanged end of the cartridge to draw it out.

As above set forth, the cartridges are adapted to hold either bulk film, that is, simply a coiled strip of film, or film as it is supplied by the manufacturer in a light-tight container from which it is fed as successive exposures are made. These containers are usually a small metal cylindrical can having axial tube extending therethrough. To accommodate these containers and position them centrally and correctly in the cartridge, the bottom wall of the recess is provided with a central, upstanding lug 483 of a diameter to loosely fit within the container tube referred to, while the inner face of the cover 474 is provided with a central recess or socket 484 into which the projecting end of the tube fits. The container is positioned in the recess 473 so that its film slot is aligned with the slot 477 and the film drawn from the container will freely pass through the film slot 477.

When using the cartridges 409 for bulk film, such as indicated by the dot-dash outline, spacer discs 485 and 486 are fitted respectively in the bottom and the top of the recess 473 to compensate for the difference in the width of film and height of the container above mentioned. To secure these spacers in place, the lug 483 is externally threaded to engage an internally threaded central aperture in the spacer 485 while the socket 484 is internally threaded to receive a central, threaded stud on the spacer 486.

In loading the cartridge 409 with either type of film, a short leader is drawn out through the film slot 477 as shown in Figure 9 for engagement with the first sprocket 414 in the film transporting mechanism. Film has a natural curl and to facilitate guiding the leader into the entrance of the film track when the loaded cartridge is inserted, a U-shaped support 487, preferably of light but relatively stiff wire, is telescopically mounted in the cartridge, and normally nesting in a groove 488 in the inner face of the cartridge. This support is capable of extension, as shown in Figure 9, to support the film leader in a substantially straight line as it extends from the film slot. In operation this wire support may be drawn outwardly with the film leader prior to insertion of the cartridge into the magazine and it will be seen that as the cartridge is pushed into its pocket in the magazine, the wire will engage the inner wall of the pocket and be again forced back to its nested position.

This magazine may include a film speed indicator arrangement to indicate the type and emulsion speed of the film with which the magazine is loaded. A rack 199A set into a longitudinal groove in the lower face of the magazine may be provided for winding a spring motor of the camera when the magazine is inserted. The last two arrangements do not form a part of this invention but may be employed if the magazine is used on the type camera such as disclosed in the above referred to application.

As above set forth, provision is made for removing a portion of the film load in the receiving cartridge 410 for processing prior to exposure of the whole film load. To accomplish this there is provided a film cutting mechanism designated generally as 490, adjacent the entrance of the film opening or slit 445 into the cartridge pocket 407. This cutting mechanism comprises a knife blade 491 secured to the lower end of a rod 492 which is slidably mounted in a guide or slot 493 extending vertically through a thickened portion 494 of the wall 406. As seen in Figure 8, the blade 491 normally occupies a position below the film channel in the track 443, with its cutting edge traversing laterally the opening 445 in the wall 406.

The knife rod 492 extends through the top wall 402 of the magazine and the film speed compensating unit and has its upper end provided with a finger engaging element or handle 495 by means of which the knife may be actuated. Preferably the handle 495 has a hinged connection with the rod 492 to be swung at right angles thereto and to nest in a socket 496 when the magazine is inserted in the camera. A suitable detent device, such as the spring loaded ball 497 engaging a peripheral groove 498 in the rod, may be provided to frictionally maintain the knife in its lowered or inoperative position.

In order to avoid exposure of the film remaining in the magazine after removal of the receiving cartridge, a light trap, such as the felt or plush strip 499 (Figure 1) is provided to seal the end of the opening 445.

The operation of the magazine, it is believed, will be obvious from the above. It may be stated briefly, however, that the feeding cartridge 409 is loaded with the desired film, a short leader is drawn out through the film slot and supported by the U-shaped wire 487. The cartridge is then inserted in the pocket 408 in the proper position for feeding the leader into the entrance to the film track. The initial insertion of the cartridge depresses the lever 435 and, as described, disengages the first sprocket 414 from the geared drive to allow this sprocket to idle and the film preforation to find easily and engage the sprocket teeth without pushing the film back into the cartridge. After the cartridge is completely inserted, the sprocket 414 will again be coupled with its gear drive.

An empty or receiving cartridge is inserted in the opposite pocket 407 in proper position, i. e. inverted with respect to the feeding cartridge so that its film slot will register with the discharge end of the film track. The film may then be transported a sufficient distance to bring the first frame behind the exposure window 450 by turning the shaft with a suitable key, or the magazine may be inserted in the camera and the film thus transported by the camera transport mechanism. In either case, the exposure counter and the film speed compensating actuator is set and the magazine is ready for use.

The film cartridges 409 and 410 are adapted to hold relatively short lengths of film, i. e. 18 or 36 exposures. For certain purposes, however, for example in making interval exposures over protracted periods of time, it is often desirable to load a camera with bulk film in relatively long lengths, for example, 250 feet. For such uses, and for those who desire to use such film, the cartridge 500 shown in Figures 10 and 11 is provided, which is interchangeable in the magazine 400 with the smaller cartridges 409 and 410.

This cartridge 500 comprises a cylindrical chamber 501 having a closed bottom 502 and a removable screw threaded cover 503. Formed integrally with the side wall of the chamber is a lateral extension 504 rectangularly shaped to closely fit the cartridge receptacles 407 or 408 of the magazine. Preferably, this extension is cored out as indicated in the drawings to reduce the weight of the cartridge.

Extending from the chamber 501, through a side wall of the extension 504 is a film slot 505, the outer end of which is adapted to register with the extremity of the film track 443. Adjacent the outer end of the slot 505 is a light trap, preferably in the form of a relatively long pile, plush strip 506 which will permit free passage of film through the slot but prevent leakage of light into the cartridge. Adjacent the juncture of the extension 504 with the side wall of the chamber 501, the extension is provided with an external flange 507 which rests against the shoulder 479 at the opening of the cartridge receptacle in the magazine to seal the same when the cartridge is inserted in the magazine.

The top wall of the extension 504 is provided with a slight depression 508 located to engage the spring clips 480 or 481 when the cartridge is fully inserted. Provision is also made of a depression (not shown) similar to the depression 437 in the smaller cartridge, for actuation of the sprocket release lever 435.

With the relatively short lengths of film, such as are used in the small cartridges, it has been found that the film being fed into the receiving cartridges by the transport mechanism will naturally follow the curvature of the film chamber, spiralling inwardly, the friction being low enough so that the magazine's transport mechanism is sufficient to feed such lengths into the cartridge. With longer lengths of film, however, a film take-up mechanism is required to assist the transport mechanism. A simple form of such take-up device is shown best in Figure 11 and comprises a squared shank spindle 509 journalled for rotation in the bottom wall 502 of the chamber 501 and extending axially into the chamber. This spindle is adapted to engage and drive a suitable spool 510 (or tube) such as shown by dot-dash lines in Figure 11. The lower end of the spindle 509 extends into a housing 511 built up on the bottom wall 502 and carries a bevel gear 512 freely rotatable thereon. This bevel gear meshes with and is driven by a bevel pinion 513 secured to the inner end of a short shaft 514 journalled in the housing 511. The outer end of the shaft 514 is provided with a squared coupling socket 515 adapted to receive a squared coupling element 516 which, when the large cartridge is used, may be attached as an accessory extension to a male coupling element or clutch 517 forming a unit of the camera, and through the coupling element, with the female element 434 of the film transport drive shaft 433 of the magazine 400. In order to compensate for the difference in peripheral speed of the take-up spool 510 as the spool fills with film, a friction clutch device between the gear 512 and the spindle 509 is provided. This clutch may take the form of a flange or washer 517, secured to the spindle 509 for rotation therewith, and a compression spring 518 interposed between the washer and gear.

Although the unit just described is of particular use as a removable film magazine for a camera it will be appreciated by those familiar with cameras that the casing 400 and its contained mechanism may form a permanent part of the camera itself without departing from the spirit underlying the invention, mainly, the provision of interchangeable film cartridges laterally insertable into the unit from the outside, and the means for automatically engaging the film with the transport mechanism.

We claim:

1. A container or magazine for supporting roll film in a photographic camera comprising a relatively elongated rectangular casing, a pair of transverse walls in the casing dividing the same into a pair of end compartments and a center compartment therebetween, the end compartments opening at the ends of the casing, each of said walls having a vertical slot adjacent corresponding ends thereof, a pair of substantially rectangular identical hollow cartridges for holding strip film, each cartridge having a cylindrical interior wall and a slot tangential thereto, the cartridge being inserted respectively in said end compartments in relatively inverted positions whereby said tangential slots register respectively with the slots in said lateral walls, said tangential slot being substantially normal to said dividing wall, an extensible supporting element carried by the cartridge for supporting an end of film withdrawn from said tangential slot in a position to be guided into a wall slot when the cartridge is inserted into an end compartment, and mechanism for transporting the film from one to another of said cartridges through said registering slots.

2. A container or magazine for supporting roll films in a photographic camera comprising a relatively elongated hollow casing, a feed cartridge for holding a supply of perforated film inserted in one end of said casing, a similar take-up cartridge for receiving said film inserted in the opposite end of the casing, mechanism including a pair of rotatable sprocket means carried by the casing respectively adjacent the feed and take-up cartridges and engageable with the perforated film for transporting the same from the feed to the take-up cartridge, common drive means for the sprocket means and including a disengageable coupling device for connecting said driving means to the sprocket means adjacent the feed cartridge, and means responsive respectively to the initial and final insertion movement of said feed cartridge into the casing for disengaging and then reengaging said coupling device to permit free rotation of the sprocket means adjacent the feed cartridge for engaging the perforations of a free end of film on said sprocket means as the feed cartridge is inserted into said casing.

3. A container or magazine for supporting roll film in a photographic camera comprising a relatively elongated case having opposed end openings constituting pocket means, a pair of film cartridges, each cartridge comprising a hollow shell inserted respectively in said pocket means longitudinally thereof, said cartridges having a portion thereof engaging the case when inserted in said pocket means to form light-tight closures for said openings, one of said cartridges constituting a feeding cartridge for unexposed film and the other cartridge constituting a receiving cartridge for exposed film.

4. A container or magazine for supporting roll film in a photographic camera comprising a relatively elongated case having opposed end openings constituting pocket means, a pair of film cartridges, each cartridge comprising a hollow shell inserted respectively in said pocket means longitudinally thereof, said cartridges having a portion thereof engaging the case when inserted in said pocket means to form light-tight closures for said openings, one of said cartridges constituting a feeding cartridge for unexposed film and the other cartridge constituting a receiving cartridge for exposed film, and detent means associated with the pocket means and cartridges for restraining displacement of the latter from the former.

5. A container or magazine for supporting roll film in a photographic camera comprising a relatively elongated case having opposed end openings constituting pocket means, a pair of film cartridges, each cartridge comprising a hollow shell inserted respectively in said pocket means longitudinally thereof, said cartridges having a portion thereof engaging the case when inserted in said pocket means to form light-tight closures for said openings, one of said cartridges constituting a feeding cartridge for unexposed film and the other cartridge constituting a receiving cartridge for exposed film, each of said shells defining a cylindrical receptacle adapted to contain coiled film, and each shell having a slot therein for passage of film to or from said receptacle, said slot communicating with the receptacle tangentially with respect thereto, and removable cover means for the receptacle.

6. A container or magazine for supporting roll film in a photographic camera comprising a relatively elongated case having opposed end openings constituting rectangular pocket means, a pair of film cartridges, each cartridge comprising an exteriorly rectangular hollow shell inserted respectively in said pocket means longitudinally thereof, said cartridges having a portion thereof engaging the case when inserted in said pocket means to form light-tight closures for said openings, one of said cartridges constituting a feeding cartridge for unexposed film and the other cartridge constituting a receiving cartridge for exposed film, each shell defining a cylindrical receptacle therein adapted to contain coiled film, said shell having a slot therein for passage of film to or from said receptacle, said slot communication with the receptacle tangentially with respect thereto, and removable cover means for the receptacle.

7. A container or magazine for supporting roll film in a photographic camera comprising a relatively elongated case having opposed end openings constituting pocket means, a pair of film cartridges, each cartridge comprising a hollow shell inserted respectively in said pocket means longitudinally thereof, said cartridges having a portion thereof engaging the case when inserted in said pocket means to form light-tight closures for said openings, one of said cartridges constituting a feeding cartridge for unexposed film and the other cartridge constituting a receiving cartridge for exposed film, and reciprocable knife means carried by the case intermediate said pocket means and adapted to traverse the film to cut the same and permit removal of a cartridge containing a portion of the film independently of the other cartridge containing the remainder of said film.

8. A container or magazine for supporting perforated roll film in a photographic camera comprising a relatively elongated case having opposed end openings constituting pocket means, a pair of film cartridges, each cartridge comprising a hollow shell inserted respectively in said pocket means longitudinally thereof, said cartridges having a portion thereof engaging the case when inserted in said pocket means to form light-tight closures for said openings, one of said cartridges constituting a feeding cartridge for unexposed film and the other cartridge constituting a receiving cartridge for exposed film, each of said shells defining a cylindrical receptacle adapted to contain coiled film, each shell having a slot therein for passage of film to or from said receptacle, said slot communicating with the receptacle tangentially with respect thereto, removable cover means for the receptacle, channel like track means in the case extending from one to the other of said cartridges and registering with the slots therein, and means including at least one sprocket having teeth traversing said track means for engaging perforations in the film to transport the film from one to the other of said cartridges.

HERBERT D. KIRBY.
CHARLES F. KRAUSE.

REFERENCES CITED

The following references are of record in the file of this patent:

UNITED STATES PATENTS

| Number | Name | Date |
| --- | --- | --- |
| 687,330 | McCurdy | Nov. 26, 1901 |
| 1,265,456 | Koch | May 7, 1918 |
| 1,532,544 | Newman | Apr. 7, 1925 |
| 1,749,523 | Willson | Mar. 4, 1930 |
| 1,756,111 | Wisner | Apr. 29, 1930 |
| 1,799,184 | Slocum et al. | Apr. 7, 1931 |
| 2,051,192 | Wittel | Aug. 18, 1936 |
| 2,095,849 | Wittel | Oct. 12, 1937 |
| 2,140,445 | Mihalyi | Dec. 13, 1938 |
| 2,158,001 | Dazey | May 9, 1939 |
| 2,220,917 | Schwartz | Nov. 12, 1940 |
| 2,225,433 | Goldberg | Dec. 17, 1940 |
| 2,257,424 | Meyer | Sept. 30, 1941 |
| 2,367,195 | Bolsey | Jan. 16, 1945 |

FOREIGN PATENTS

| Number | Country | Date |
| --- | --- | --- |
| 617,687 | Germany | Aug. 23, 1935 |
| 631,285 | Germany | June 17, 1936 |